May 7, 1957 J. F. HOUDEK, JR 2,791,638

TELEPHONE WITH A PUSH-BUTTON IMPULSE SENDER

Original Filed April 12, 1952

1

2,791,638

TELEPHONE WITH A PUSH-BUTTON IMPULSE SENDER

Joseph F. Houdek, Jr., Elmhurst, Ill., assignor to International Telephone and Telegraph Corporation, a corporation of Maryland Original application April 12, 1952, Serial No. 281,997, now Patent No. 2,749,388, dated June 5, 1956. Divided and this application December 23, 1955, Serial No. 554,958

2 Claims. (Cl. 179—90)

Figure 1:
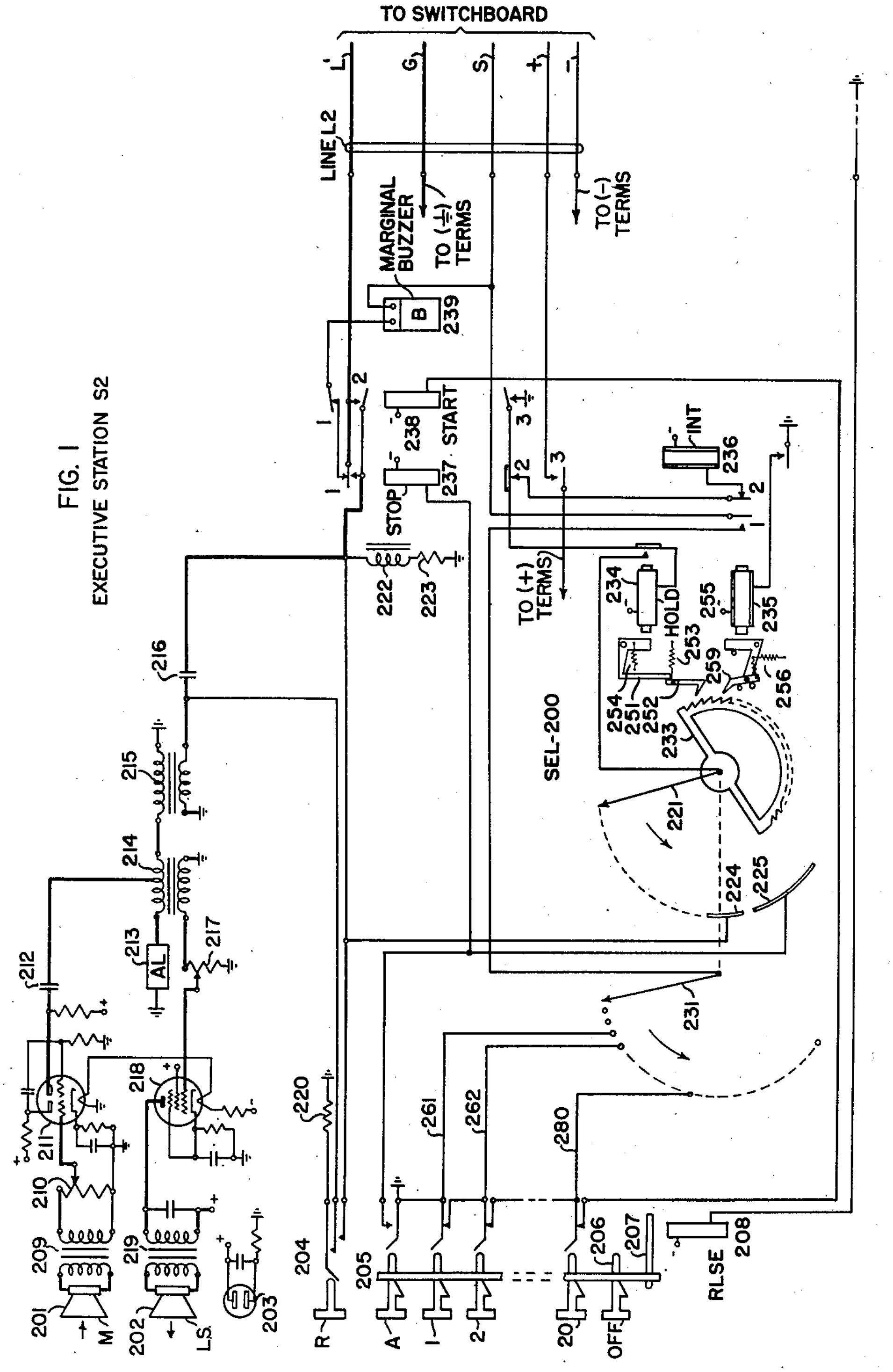

This invention relates to a telephone with a push-button impulse sender. Its principal object is to provide a new and improved telephone having a simple and economical arrangement for responding to the operation of any one of a number of push-buttons to transmit respectively corresponding telephone line numbers.

This application is a division of my prior application for An Automatic Intercommunication Telephone System, Serial Number 281,997, filed April 12, 1952, now Patent No. 2,749,388.

The telephone set disclosed herein is of the push-button type and is arranged for use in telephone systems of the type shown in my prior application wherein a separate selector is employed for each line. In such systems, to maintain a low cost per line, economies must be present in the station apparatus as well as in the selector apparatus.

Heretofore, in telephone sets wherein the calling of desired line numbers was controlled by push-buttons rather than by the usual telephone dial mechanism, it was customary to employ motor-driven devices to transmit impulses characteristic of a desired line. In general, motor-driven devices, in addition to being cumbersome, are quite expensive and accordingly find little application in systems of the foregoing character.

According to the present invention, economies in push-button-controlled impulse-transmitting devices are realized by the employment of a simple and economical switching mechanism which is controlled by simple relay interrupter arrangement.

Several features of the telephone set here employed reside in the control circuit arrangement for controlling the starting and stopping of the switch mechanism and in the arrangement for controlling the number of impulses transmitted according to the line selected by push-button operation.

The above-mentioned and other features and objects of this invention and the manner of attaining them will become more apparent, and the invention itself will be best understood, by reference to the following description of an embodiment of the invention taken in conjunction with the accompanying drawing wherein Fig. 1 shows a push-button controlled telephone station or executive station S2 connected to the selectors of the switchboard shown in my prior application by two conductors L, and S and supplied by power over conductors G, +, and —.

Station S2, being of the loud-speaking type, includes a microphone pickup unit 201 and a loud-speaker unit 202 connected to respective transmitting and receiving amplifiers. In place of the conventional dial, the executive station is equipped with a push-button calling device comprising buttons 1 to 20 of device 205, together with a stepping selector SEL–200 and associated relays. Device 205 also includes an answer key A and a disconnect key Off which cooperate with keys 1 to 20 in controlling the line in lieu of the usual hookswitch. Executive station S2 includes a ringing push-button 204 for signalling called lines and a signal buzzer 239 for serving as the executive station ringer.

2

The operation of executive station S2 on line L2 in extending a call to a desired other line (not shown) will now be described.

The party at any executive station S2, to call another line, depresses the push button corresponding to the desired line to be called and waits for the party at the called line to answer, as the ringing operation is fully automatic.

Assuming push button 1 is depressed, it is mechanically engaged and held in a depressed condition by retaining bar 206. Contacts of push button 1 remove ground potential from the winding of normally operated start relay 238, restoring it. Contacts 1 and 2 of relay 238 transfer line conductor L′ from buzzer 239 to the microphone and loud-speaker amplifier circuits, and its contacts 3 extend ground potential to the windings of interrupter relay 236 and hold magnet 234.

Contacts 2 of relay 238, in addition to connecting the amplifiers to line conductor L′, extend ground potential through resistor 223 and coil 222 to line conductor L′ from whence it is extended to the selector unit associated with the line to which station S2 is assigned and prepares for its operation responsive to control from executive station S2.

At the same time, hold magnet 234 operates from ground at contacts 3 of relay 238 and its makes contacts extend such operating ground to brush 221 of selector SEL–200 in preparation for automatically signalling the desired called station at the proper time. Armature 251 of magnet 234 is actuated against the light tension of its restoring spring 254 and releases latch 252, which is moved by its light tension spring 253 into effective holding engagement with the teeth of rack 233, thereby preparing selector SEL–200 for operation.

Also, at the same time, interrupter relay 236 operates from the ground at break contacts 3 of now-restored start relay 238 and at its make contacts extend ground to the winding of stepping magnet 235, operating it. Contacts 2 of stepping magnet 235 open the operate circuit of the interrupter relay, which restores a short time later to restore stepping magnet 235. With the restoration of magnet 235, the operate circuit of the interrupter relay is again closed and the sequential operation and restoration of relay 236 and magnet 235 is repeated. This cycle of interrupter relay and stepping magnet operation and restoration continues until stop relay 237 operates, to open the operate circuit of interrupter relay 235.

With each impulse transmitted to the battery-connected winding of stepping magnet 235 from contacts of relay 236, stepping magnet 235 operates its armature 225 against the tension of restoring spring 256. Each time armature 225 is actuated, its pawl 259 engages the associated tooth to advance rack 233 and brushes 221 and 231, one step. Brushes 221 and 231 are thereby caused to move from their illustrated normal position into engagement with the switch contacts successively, thereby becoming successively connected with the contacts of push buttons 1 to 20 over their respective wires 261 to 280. After each step, brushes 221 and 231 are held in their advanced position by the engagement of latch 252 with the teeth of rack 233.

When all push buttons are in restored condition (as illustrated), ground is extended to the winding of start relay 238, holding it operated. Upon the depressing of one of the push buttons corresponding to a desired line, ground is removed from the winding of relay 238, as well as from each of the wires 261 to 281 which are associated with the push buttons following the one which was depressed. Thus, as brush 231 advances across the switch contacts associated with the wires 261 to 280, ground is extended thereover from each wire, up to and including, the wire corresponding to the push button depressed. Brush 231 thereafter continues advancing but without contacting ground potential on the remaining wires.

Since the desired line called is assumed to be the first line, and push button 1 of push-button assembly 205 is depressed, ground potential is removed from wires 262 to 281, which are associated with the remaining push buttons 2 to 20. Brush 231 of unit SEL–200, advancing across the switch contacts associated with wires 261 to 280, contacts ground on wire 261 and no others, and in conjunction with contacts 1 of stepping magnet 235, transmits one impulse to the stepping magnet (not shown) of the switchboard selectors to control it to make connection with the called line which corresponds to the push button depressed.

If the called line is busy, ringing potential is applied to the called line but is ineffective. After the completion of the ringing period, busy tone is returned to station S2. If the called line is idle, the called station is effectively signalled as will be described.

As brush 231 of selector unit SEL–200 passes the last switch contact associated with the push buttons, grounded brush 221 makes contact with ringing bar 224 which is connected to line conductor L′ of line L2 through contacts on relay 238. Responsive to the transmission of ground to conductor L′ through contacts on relay 238, operations occur as described in my prior application which energizes the buzzer at the called station to signal the called party on the called line, such buzzer being connected to line conductors through the usual hookswitch or in the manner in which the executive station buzzer is connected. The buzzer of the called station is energized as long as brush 221 is in contact with ringing bar 224 and may, for example, extend over a period of several interrupter cycles.

After advancing beyond ringing bar 224, responsive to the continued operation and restoration of stepping magnet 235, grounded brush 221 makes contact with stop bar 225 which is directly connected to the battery-connected winding of stop relay 237, thereby operating it. Contacts 2 of relay 237 open the operate circuit of interrupter relay 236, thereby stopping the advancement of stepping relay 235. Contacts 3 extend positive battery potential to the amplifiers, preparing them for use. The calling party at station S2 awaits answer by the called party, or a busy-tone signal in the event that the called line is busy, such busy tone being returned to the calling party through the loud-speaker amplifier.

If the called party fails to answer responsive to the automatic ringing, an additional ring signal may be provided manually by depressing ring button 204 which applies ground through resistor 220 directly to conductor L′ of line L2. Thus, the line of the called party may be manually rung until answered.

Voice signals from the calling party, after the called party answers, are fed to transformer 209 from transmitter 201 and then passed through volume control 210 to the first grid of the dual-triode amplifier tube 211. The output of amplifier tube 211 is coupled by condenser 212 to the center-tapped transformer 214 and inductively coupled to line conductor L′. The microphone output is divided at the transformer center-tap, by a balanced network including artificial line 213, to cancel any reproduction (howling) by the loud-speaker of signals from the microphone. The amplified signals from the microphone amplifier are transmitted to the called line over the connections established by the selector unit associated with the calling station S2.

Return signals from the called line are fed to impedance-matching transformer 215 through coupling condenser 216, and are inductively coupled to the grid of the cathode-biased amplifier tube 218 through volume control potentiometer 217. The output of amplifier tube 218 is inductively coupled by transformer 219 to loud-speaker 202 which reproduces the transmitted signals. The feed-back signals between loud-speaker 202 and microphone 201 are cancelled by the use of artificial line 213. An On indicating lamp 203, of the gaseous discharge type, is caused to glow as long as the amplifier circuits are energized by a positive potential.

When the conversation between the calling and called parties is completed, the called line disconnects by replacing the usual receiver on its hookswitch, and the calling party disconnects by depressing push button Off. The depressing of the Off button in station S2 disengages any push button from 1 to 20 which was held in a depressed condition. Ground potential is thereby reapplied to the battery-connected winding of start relay 238, operating it. Contacts 3 of relay 238 disconnect ground potential from the winding of hold relay 234, releasing it. The release of hold magnet 234 disengages pawl 252 thereby permitting brushes 221 and 231 to be returned to their normal illustrated position by a returning spring, not shown.

Relay 208, serving to release any operated push button, functions as described in my prior application under control of a regular station (not shown) which may be associated with the executive station S2.

Withe brush 221 in its restored position, the operating and hold circuit of stop relay 237 is opened and it restores. Its contacts 3 remove positive battery potential from the amplifiers, thereby returning them to normal condition. Contacts 1 disconnect the amplifiers from line conductor L′ and open the holding circuit of the switchboard selector (not shown). The calling lines L2 and the called line are now in an idle condition and in readiness for originating or answering another call.

When line L2 is called, buzzer 239 is energized from ground on conductor L1 appearing through contacts 1 of relays 237 and 238. The call may be answered at executive station S2 by depressing answer push button A of push-button assembly 205. Contacts of push button A extend ground potential to the winding of stop relay 237, energizing it. As hereinbefore described, the operation of stop relay 237 disconnects buzzer 239 and causes the amplifier circuits to be energized and connected to the calling line. Conversation may be carried on with the calling party over the executive station unit as previously described.

Upon completion of the conversation, push button Off of the push-button assembly 205 is depressed and disengages the answer button, thereby restoring stop relay 237 and returning the executive station apparatus to normal idle condition.

While I have described above the principles of my invention in connection with specific apparatus, it is to be clearly understood that this description is made only by way of example and not as a limitation to the scope of my invention.

I claim:

1. In a telephone station for use on a line of an automatic switching system, a start relay, digit-marking conductors, digit keys associated respectively with said conductors, means responsive to an actuation of any said digit key for placing a corresponding digit-marking condition on said conductors and for causing an operation of said start relay, a sending-start wire, means responsive to said operation of the start relay for imposing a calling condition on the said line and for energizing said start wire, a stepping switch having access to said digit-marking conductors, a stepping magnet and an interrupter relay for said stepping switch, means responsive to the said energization of said start wire for causing said interrupter relay and stepping magnet to interact cyclically, whereby the stepping magnet is operated and restored repeatedly to advance said stepping switch into contact with said digit-marking conductors successively and to advance beyond the last one, means responsive to said stepping switch advancing over said marking conductors for sending over said line a number of switch-control impulses corresponding to the digit-marking condition thereon, a stop relay and means for operating it responsive to said stepping switch advancing beyond said marking conductors, and means including contacts on said stop relay for terminating the said interaction of the interrupter relay and stepping magnet.

2. In a telephone station as set forth in claim 1, voice-current transmitting and receiving apparatus and amplifiers associated therewith requiring plate current for their amplifying operation, and means including other contacts of said stop relay for supplying said plate current.

No references cited.